(12) United States Patent
Ross et al.

(10) Patent No.: US 7,454,984 B1
(45) Date of Patent: Nov. 25, 2008

(54) FLOW METER FOR MEASURING A FLOW RATE OF A FLOW OF A FLUID

(75) Inventors: David A. Ross, Columbiaville, MI (US); Loren M. Thompson, Lapeer, MI (US); Paul G. DeDecker, Clinton Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/848,872

(22) Filed: Aug. 31, 2007

(51) Int. Cl.
*G01F 1/22* (2006.01)
(52) U.S. Cl. .................................. 73/861.52
(58) Field of Classification Search .............. 73/861.61, 73/861.52, 204.21
See application file for complete search history.

(56) References Cited

U.S. PATENT DOCUMENTS

| | | | |
|---|---|---|---|
| 3,838,598 A | 10/1974 | Tompkins | |
| 4,418,723 A | 12/1983 | Koni et al. | |
| 4,800,754 A | 1/1989 | Korpi | |
| 4,884,459 A * | 12/1989 | Beyazov et al. | 73/861.52 |
| 4,961,344 A | 10/1990 | Rodder | |
| 5,088,332 A | 2/1992 | Merilainen et al. | |
| 5,357,793 A * | 10/1994 | Jouwsma | 73/202 |
| 5,445,035 A | 8/1995 | Delajoud | |
| 5,750,892 A | 5/1998 | Huang et al. | |
| 5,804,717 A | 9/1998 | Lucas | |
| 5,829,685 A * | 11/1998 | Cohen | 239/533.1 |
| 6,128,963 A | 10/2000 | Bromster | |
| 6,128,967 A * | 10/2000 | Campbell | 73/866.5 |
| 6,655,207 B1 | 12/2003 | Speldrich et al. | |
| 7,051,765 B1 | 5/2006 | Kelley et al. | |

* cited by examiner

*Primary Examiner*—Jewel Thompson
(74) *Attorney, Agent, or Firm*—Thomas N. Twomey

(57) ABSTRACT

A flow meter for measuring a flow rate of a flow of a fluid includes a housing member including a first section configured to matingly couple with a second section. The flow meter further includes an integrally formed laminar flow member removably held within at least a portion of the first section of the housing member. The laminar flow member includes a body and a plurality of channels integrally formed within the body, wherein each of the plurality of channels is substantially continuous in the longitudinal direction and substantially continuous in the transverse direction.

16 Claims, 1 Drawing Sheet

FLOW METER FOR MEASURING A FLOW RATE OF A FLOW OF A FLUID

BACKGROUND

The present disclosure relates generally to flow meters and, more particularly, to a flow meter for measuring a flow rate of a flow of fluid.

Flow meters may be used in, e.g., a pulsed fluid flow system to determine a flow rate of a pulsed flow of fluid traveling through the system. In some instances, the flow meter determines the flow rate of the fluid by measuring a pressure drop across two defined points of a fluid channel formed in the flow meter, and calculating the flow rate based on the pressure drop measurement. Since pulsed flow of a fluid, such as, e.g., oxygen in an oxygen delivery system, includes substantially rapid (e.g., every 100 milliseconds or so) rising and falling flow rates per delivery cycle, the flow rate of the pulsed flow of fluid may be determined by first inducing laminar flow of the fluid through the flow meter. Then the pressure drop of the fluid across the device is measured, and the flow rate is calculated based on a linear relationship (due to laminar flow) with the pressure drop across the device.

Some of the flow meters currently used in pulsed flow systems include a laminar flow chamber to induce laminar flow of the fluid, which creates a substantially stable pressure drop across the flow meter. The laminar flow chamber may include several laminar flow channels formed by stacking several individual plates, often made of steel or other similar metals, in a very precise manner and forming a void space between them. Due to this precision assembly of several parts, mass production of these flow meters is generally very difficult, if available at all.

SUMMARY

A flow meter for measuring a flow rate of a pulsed flow of a fluid includes a housing member including a first section configured to matingly couple with a second section. The flow meter further includes an integrally formed laminar flow member removably held within at least a portion of the first section of the housing member. The laminar flow member includes a body and a plurality of channels integrally formed within the body, wherein each of the plurality of channels is substantially continuous in the longitudinal direction and substantially continuous in the transverse direction.

A method of determining a flow rate of a pulsed flow of fluid includes providing a flow meter including a housing member including a first section configured to matingly couple with a second section, and an integrally formed laminar flow member removably held within at least a portion of the first section of the housing member. The laminar flow member includes a body and a plurality of channels integrally formed within the body, wherein each of the plurality of channels is substantially continuous in the longitudinal direction and substantially continuous in the transverse direction. The method further includes delivering the pulsed flow of fluid through the flow meter, measuring the pressure drop across the flow meter, and determining the pulsed flow of the fluid based on the pressure drop.

BRIEF DESCRIPTION OF THE DRAWINGS

Features and advantages of embodiments of the present disclosure will become apparent by reference to the following detailed description and drawings, in which like reference numerals correspond to similar, though perhaps not identical components. Reference numerals having a previously described function may or may not necessarily be described in connection with other drawings in which they appear.

DETAILED DESCRIPTION

Embodiment(s) of the flow meter as disclosed herein may be advantageously used to determine the flow rate of a pulsed flow of a fluid substantially instantaneously and with relative certainty. The flow meter is designed to include an integrally formed laminar flow member including a plurality of channels integrally formed therein. The laminar flow member may be easily assembled within a housing member of the flow meter, thereby permitting the flow meter to be produced on a mass production scale. Further, the integrally formed laminar flow member advantageously does not include any intricate and/or delicate parts and, thus, is substantially simple in design and is relatively easy to maintain.

As defined herein, the term "longitudinal direction" refers to a direction extending lengthwise along the flow meter. Also defined herein, the term "transverse direction" refers to a direction crossing the longitudinal direction.

Figure 1:
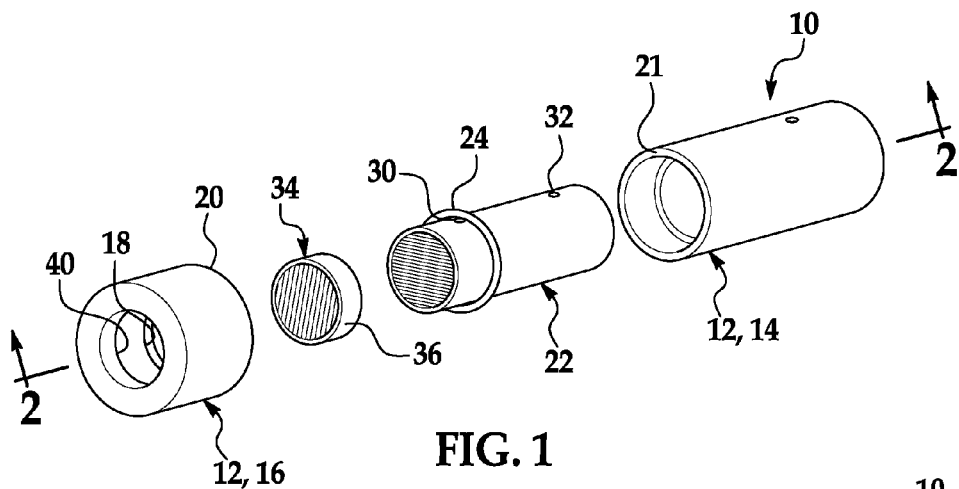
FIG. 1 is an exploded perspective view of an embodiment of a flow meter as disclosed herein.
Figure 2:
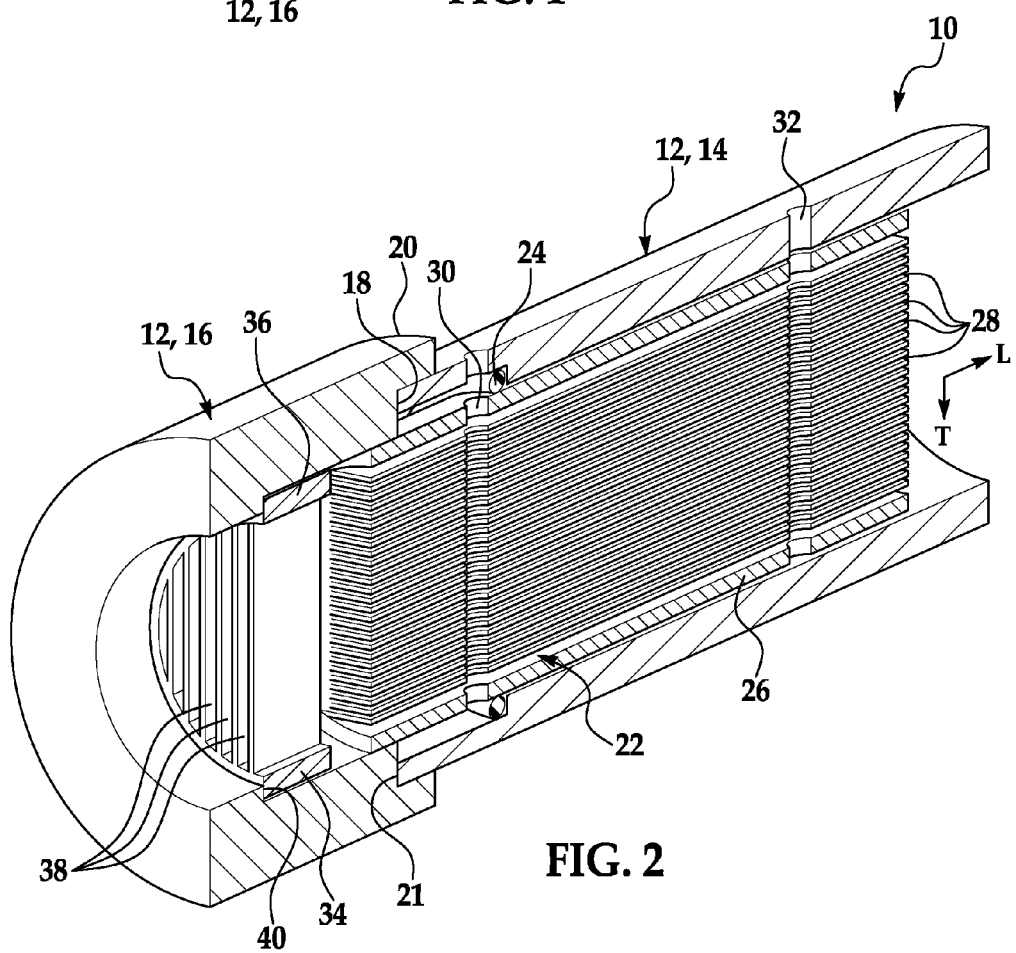
FIG. 2 is an enlarged, cross-sectional perspective view of an assembled flow meter taken along line 2-2 of FIG. 1.

The flow meter for measuring a flow rate of a pulsed flow of a fluid is shown in FIG. 1. The flow meter 10 includes a housing member 12 including a first section 14 and a second section 16. In an embodiment, the first section 14 is configured to matingly couple with the second section 16, as shown in FIG. 2. In a non-limiting example, the second section includes an annular step 18 formed in an end 20 thereof, thereby defining a mating surface configured to receive an end 21 of the first section 14. In a non-limiting example, the diameter of the annular step 18 is substantially the same as the outer diameter of the first section 14 so that when the first section 14 couples with the second section 16, the first section 14 is substantially press fit within the annular step 18. Other non-limiting examples of coupling the first and second sections 14, 16 include joining sections 14, 16 using, e.g., a fastener and/or the like, gluing the sections 14, 16 together with a suitable adhesive, welding the sections 14, 16 together, and/or the like, and/or combinations thereof.

The flow meter 10 further includes a laminar flow member 22 removably held within the housing 12. As shown in FIG. 2, the laminar flow member 22 is held within at least a portion of the first section 14, and a suitable seal (e.g., an O-ring 24 within a receiving groove, as shown) may be disposed therebetween. In a non-limiting example, a portion of the laminar flow member 22 also extends into the second section 16, when the first and second sections 14, 16 of the housing 12 are coupled. It is to be understood, however, that other designs and/or configurations of the assembly of the housing member 12 and the laminar flow member 22 are also within the scope of the present disclosure. For example, the laminar flow member 22 may not extend into the second section 16, but rather may be maintained in the first section 14.

The laminar flow member 22 is an integrally formed member generally including a body 26 and a plurality of channels 28 integrally formed within the body 26. In an embodiment, the laminar flow member 22 is formed by extruding a substantially rigid tube (e.g., formed from a substantially rigid, extrudable polymeric material that retains its shape after cooling), including the channels 28 into a single piece. A few non-limiting examples of suitable extrudable polymeric materials include polycarbonate, polyvinyl chloride (PVC), polypropylene, and the like, and combinations thereof. The extrusion process generally produces a substantially durable laminar flow member 22, whose structure tends not to break down over continued use thereof. The extrusion process also allows the laminar flow member 22 to be fabricated so that the channels 28 are formed having substantially no deformities that could cause perturbations of the flow path. It is to be understood that this type of deformity generally tends to agitate the flow paths between the channels 28, which may have a negative effect on the calculated flow rate based on pressure readings taken by, e.g., pressure sensors employed by the flow meter 10. The pressure sensors will be described below in more detail.

In a non-limiting example, the laminar flow member 22 is also formed having an outer diameter, length, and number of channels 28, which are predetermined based on a hypothesized flow rate of the fluid. The integrally formed laminar flow member 22 is fabricated using specifically chosen fabrication methods and/or materials to obtain substantially instantaneous and repeatable, and highly accurate, flow rate readings using the flow meter 10. To accomplish this, the channels 28 may be defined by a plurality of substantially parallel-arranged slabs integrally formed with the body 26 of the laminar flow member 22, where a void space is defined between each slab. The channels 28 each generally include a width along a transverse axis T and a length along a longitudinal axis L, where the width and length of the channels 28 are also predetermined based on a hypothesized flow rate of the fluid. Further, each of the channels 28 is substantially similar in width and length, whereby the width and length may be determined by a number of factors including, but not limited to, an expected fluid velocity, the viscosity of the fluid, and/or the like, and/or combinations thereof.

It is to be understood that the flow rate of the fluid flowing in the longitudinal direction through the several channels 28 may then be determined based on the pressure drop across the flow meter 10. The pressure drop generally has a linear and proportional relationship with the flow rate under laminar flow conditions, as opposed to a non-linear relationship typical of turbulent flow. Thus, the pressure drop across the flow meter can be calculated based on pressure measurements taken at two predefined locations on the flow meter 10, and the flow rate can be calculated from the pressure drop.

Further, it is to be understood that the width and length of the channels 28 may be determined so that the velocity of the fluid (i.e., the flow rate) in the longitudinal direction is substantially the same through every channel 28, whereas the velocity of the fluid in the transverse direction is about zero. This allows the pressure drop to also be substantially the same across each channel 28.

The laminar flow member 22 is configured to substantially change the pulsed flow of the fluid through the flow meter 10 from substantially turbulent flow to substantially laminar flow, and is further configured to substantially stabilize the pressure drop of the pulsed flow of the fluid to thereby determine the flow rate of the fluid. This is accomplished by arranging the plurality of channels 28 of the laminar flow member 22 to be substantially continuous in the transverse direction and to arrange each individual channel 28 to be substantially continuous in the longitudinal direction. It is to be understood, however, that many other configurations of the laminar flow member 22 may be fabricated and employed in the flow meter 10 to achieve substantially laminar flow from a pulsed flow of the fluid.

Formed into the body 26 of the laminar flow member 22 are first and second pressure ports 30, 32 that extend substantially transversely through the channels 28. In a non-limiting example, the pressure ports 30, 32 are fabricated (e.g., by laser cutting) into the integrally formed laminar flow member 22, and each include a diameter ranging from about 0.1 mm to about 1 mm.

The first and second pressure ports 30, 32 are connected to a pressure measuring device or sensor (not shown) that measures the inlet pressure of the fluid passing through the first pressure port 30 and the outlet pressure of the fluid passing through the second pressure port 32. The difference between the pressure readings may then be used to calculate the flow rate of the laminar fluid flowing through the flow meter 10. It is to be understood that a suitable pressure sensor includes a suitable frequency range that may be selected based on the change in flow rate. This may be important for pulsed fluid flow, where the velocity of the fluid changes very rapidly and, thus, tends to be turbulent. In an embodiment, a suitable pressure sensor includes, but is not limited to, a relatively fast transient response pressure transducer (one non-limiting example of which has at most 1 millisecond response time).

It is also generally desirable to configure the first and second pressure ports 30, 32 to substantially equalize the pressure of the fluid flowing through each of channels 28. It is to be understood that it is generally advantageous to have a substantially equal pressure distribution between each of the channels 28 to thereby permit a relatively accurate pressure measurement at each of the pressure ports 30, 32. Without being bound to any theory, it is believed that, if the pressure is equalized through each channel 28, shunting of the fluid may be substantially reduced.

In an embodiment, the flow meter 10 may further include a flow straightener 34 (non-limiting examples of which include straightening vanes, an array of tubes, or the like) disposed or otherwise received within at least a portion of the second section 16 of the housing 12. Generally, the flow straightener 34 may be used in the flow meter 10 to contribute to reducing the turbulence of the fluid flowing therethrough. This may be particularly useful in instances where the turbulent flow of the fluid is at a level exceeding the flow capabilities of the laminar flow member 22. As shown in FIG. 2, if a flow straightener 34 is used in the flow meter 10, another annular step 40 is formed in the second section 16 of the housing and is configured to receive the flow straightener 34. When the first and second sections 14, 16 are coupled, the flow straightener 34 is located substantially adjacent to the laminar flow member 22 and adjacent to the step 40. As such, the flow straightener 34 may reduce the highly turbulent flow of the fluid into a less turbulent flow prior to the fluid entering the laminar flow member 22.

In another embodiment, the flow meter 10 may include a second flow straightener 34 (not shown) disposed or otherwise received therein, where one flow straightener 34 may be disposed at one end of the flow meter 10, and the other flow straightener 34 may be disposed at an opposite end of the flow meter 10. These flow straighteners 34 may contribute to minimize turbulence of the fluid as the fluid enters and leaves the flow meter 10.

The flow straightener 34 generally includes a body 36 and a plurality of channels 38 integrally formed within the body 36. Similar to the construction of the laminar flow member 22, each of the channels 38 is substantially continuous in the longitudinal direction, while the plurality of the channels 38 is substantially continuous in the transverse direction. In a non-limiting example, the flow straightener 34 is similarly formed like the laminar flow member 22, where the flow straightener 34 is an extruded body 36 including the channels 38.

In an embodiment, the flow straightener 34 is disposed within the housing 12 and adjacent to the laminar flow member 22 such that the channels 38 of the flow straightener 34 are angularly offset from the channels 28 of the laminar flow member 22. In a non-limiting example, and as shown in FIG. 2, the channels 38 of the flow straightener 34 are substantially perpendicular in the transverse direction to the channels 28 of the laminar flow member 22. It is to be understood, however, that other angular offsets may also be used. Generally, the angle difference or offset (if any) between the channels 38 of the flow straightener 34 and the channels 28 of the laminar flow member 22 is selected so that the flow of the fluid traveling through the flow meter is distributed substantially evenly throughout the flow meter 10. This may contribute to obtaining laminar flow of the fluid through the flow meter 10, thereby allowing substantially more accurate pressure measurements by the pressure sensors. In another non-limiting example, the flow straightener 34 may be disposed within the housing 12 so that the channels 38 are substantially parallel with the channels 28 of the laminar flow member 22.

The flow meter 10 is generally made by forming the laminar flow member 22, removably disposing the laminar flow member 22 in at least a portion of the first section 14 of the housing 12, and matingly coupling the first and second sections 14, 16 together. In an embodiment, the flow straightener 34 is disposed in at least a portion of the second section 16 of the housing 12 so that the flow straightener 34 is located substantially adjacent the laminar flow member 22. In this embodiment, the flow straightener 34 is positioned in the second section 16 so that the channels 38 of the flow straightener 34 are angularly offset from the channels 28 of the laminar flow member 22.

While several embodiments have been described in detail, it will be apparent to those skilled in the art that the disclosed embodiments may be modified and/or other embodiments may be possible. Therefore, the foregoing description is to be considered exemplary rather than limiting.

What is claimed is:

1. A flow meter for measuring a flow rate of a flow of a fluid, comprising:
    a housing member including a first section configured to matingly couple with a second section; and
    an integrally formed laminar flow member removably held within at least a portion of the first section of the housing member, the laminar flow member including:
        a body; and
        a plurality of channels integrally formed within the body, wherein each of the plurality of channels is substantially continuous in the longitudinal direction and the plurality of channels is substantially continuous in the transverse direction.

2. The flow meter as defined in claim 1 wherein the flow of the fluid is a pulsed flow.

3. The flow meter as defined in claim 1, further comprising first and second pressure ports formed in the body of the laminar flow member and extending substantially transversely through the plurality of channels.

4. The flow meter as defined in claim 3 wherein the first and second pressure ports are configured to substantially equalize the pressure of the fluid flowing through each of the plurality of channels.

5. The flow meter as defined in claim 1 wherein each of the plurality of channels includes a predetermined width along a transverse axis, a predetermined length along a longitudinal axis, or combinations thereof; and wherein the predetermined width and length is based on a flow rate of the fluid flowing through the flow meter.

6. The flow meter as defined in claim 5 wherein each of the plurality of channels is substantially similar in width and length.

7. The flow meter as defined in claim 1, further comprising a flow straightener including:
    a body; and
    a plurality of channels integrally formed within the body, wherein each of the plurality of channels is substantially continuous in the longitudinal direction and the plurality of channels is substantially continuous in the transverse direction.

8. The flow meter as defined in claim 7 wherein the flow straightener is received in at least a portion of the second section; and wherein when the first and second sections are coupled, the flow straightener is located substantially adjacent the laminar flow member.

9. The flow meter as defined in claim 8 wherein the flow straightener is further positioned so that the plurality of channels of the flow straightener are angularly offset from the plurality of channels of the laminar flow member or are substantially parallel to the plurality of channels of the laminar flow member.

10. The flow meter as defined in claim 9 wherein the plurality of channels of the flow straightener are substantially perpendicular in the transverse direction to the plurality of channels of the laminar flow member.

11. The flow meter as defined in claim 1, further comprising a seal disposed between the laminar flow member and the housing member.

12. The flow meter as defined in claim 1 wherein the laminar flow member is configured to substantially change the flow of the fluid through the flow meter from substantially turbulent to substantially laminar, and further configured to substantially stabilize the pressure drop of the flow of the fluid to thereby determine the flow rate of the fluid.

13. A method of determining a flow rate of a pulsed flow of fluid, comprising:
    providing a flow meter, including:
        a housing member including a first section configured to matingly couple with a second section; and
        an integrally formed laminar flow member removably held within at least a portion of the first section, the laminar flow member including:
            a body; and
            a plurality of channels integrally formed within the body, wherein each of the plurality of channels is substantially continuous in the longitudinal direction and the plurality of channels is substantially continuous in the transverse direction;
    delivering the pulsed flow of fluid through the flow meter; and
    measuring the pressure drop across the flow meter; and
    determining the flow rate of the pulsed flow of the fluid based on the pressure drop.

14. The method as defined in claim 13 wherein the flow meter further includes a flow straightener disposed in at least a portion of the second section and positioned substantially adjacent the laminar flow member, and wherein the flow straightener includes:
    a body; and
    a plurality of channels integrally formed within the body, wherein each of the plurality of channels is substantially continuous in the longitudinal direction and the plurality of channels is substantially continuous in the transverse direction.

15. The method as defined in claim 13 wherein the laminar flow member further includes first and second pressure ports formed therein and extending substantially transversely through the plurality of channels.

16. The method as defined in claim 13 wherein pulses of substantially turbulent fluid flow into the flow meter and become substantially laminar as the fluid flows through the plurality of channels of the laminar flow member.

* * * * *